April 5, 1966     G. C. ENSLEY     3,244,402
APPARATUS FOR INSTALLING LINES THROUGH CONDUITS
Filed Jan. 20, 1964     2 Sheets-Sheet 1
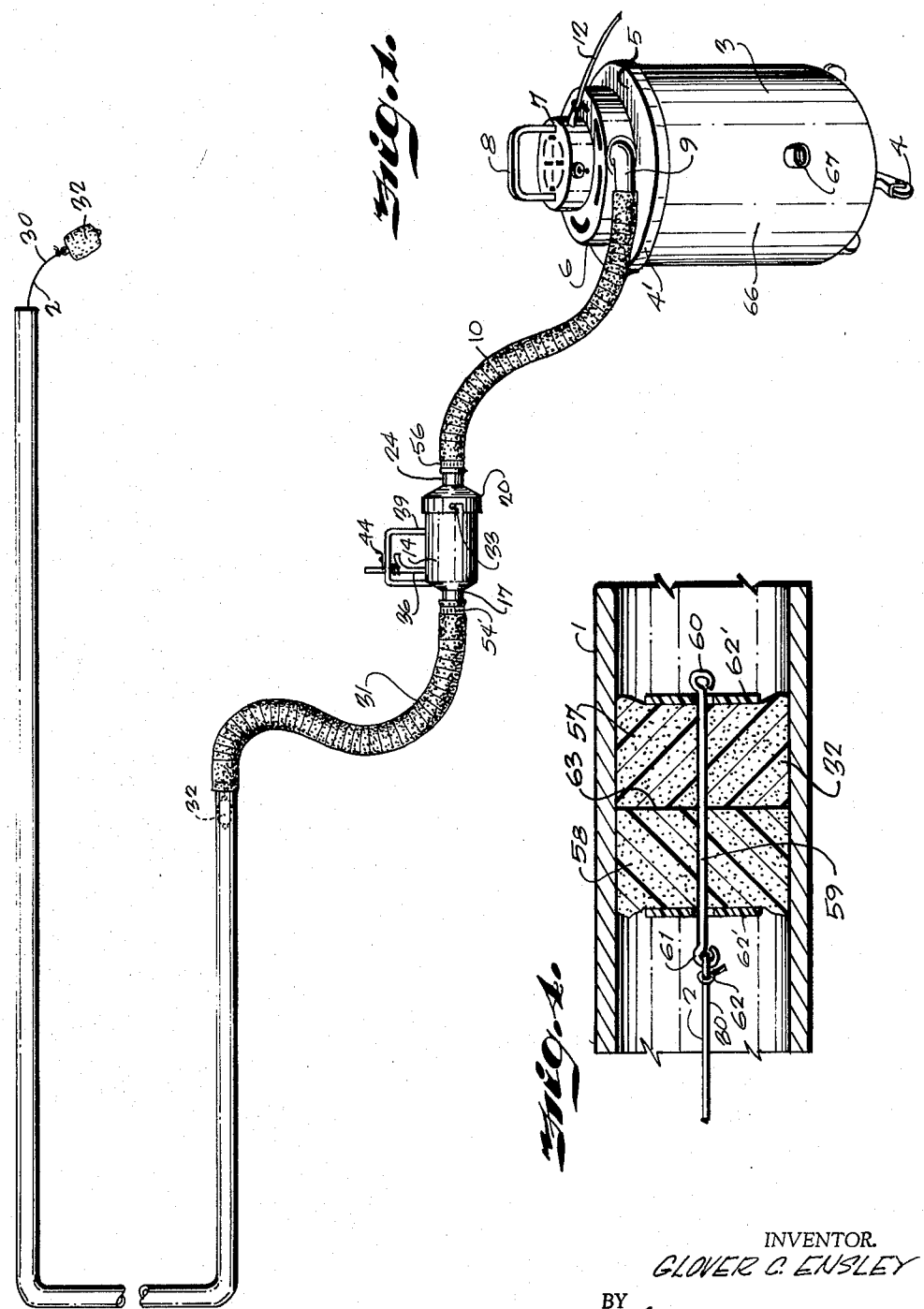
INVENTOR.
GLOVER C. ENSLEY
BY
Fishburn & Gold
ATTORNEYS April 5, 1966 G. C. ENSLEY 3,244,402
APPARATUS FOR INSTALLING LINES THROUGH CONDUITS
Filed Jan. 20, 1964 2 Sheets-Sheet 2
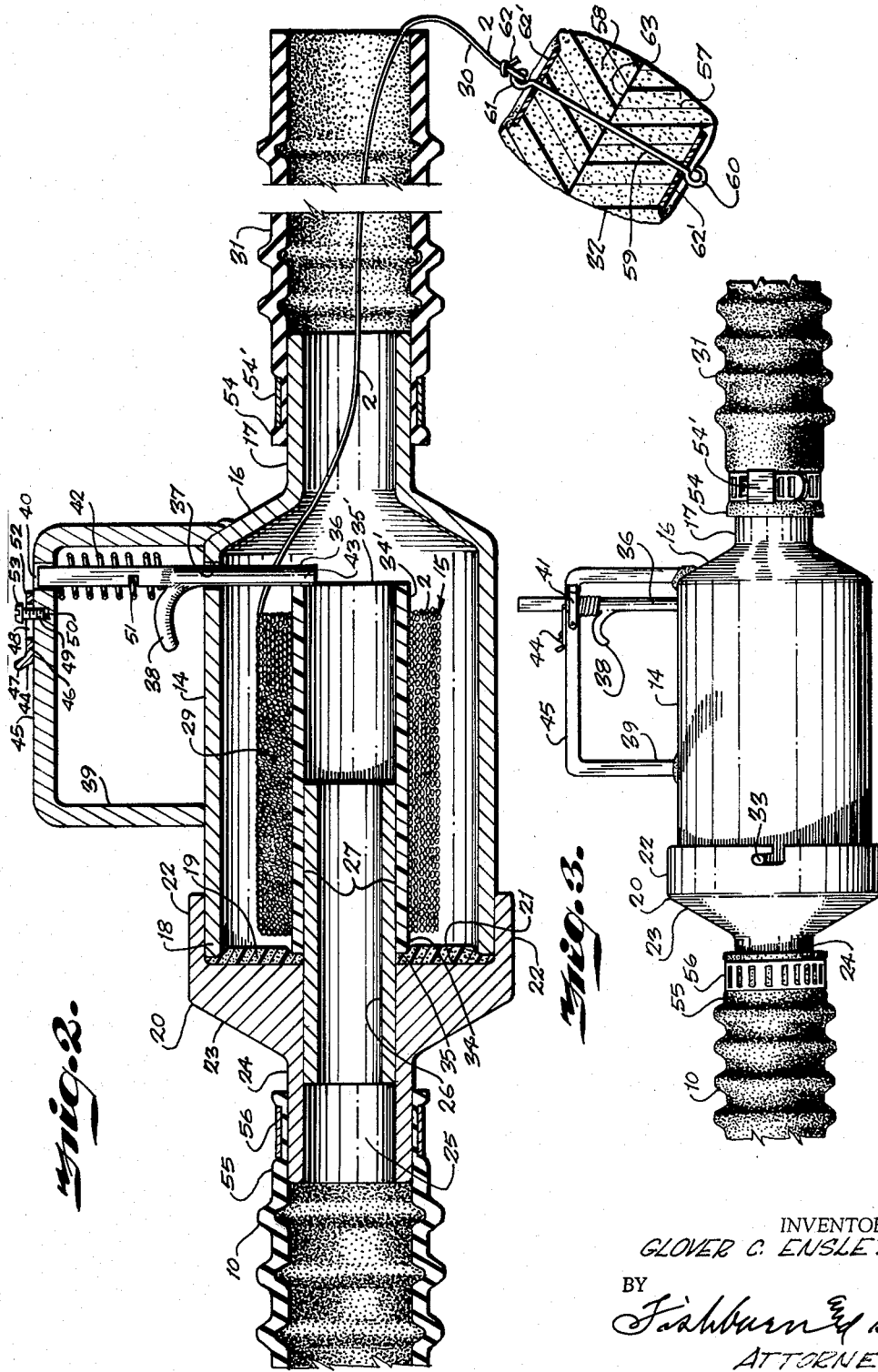
INVENTOR.
GLOVER C. ENSLEY
BY
Fashburn & Gold.
ATTORNEYS

United States Patent Office 3,244,402
Patented Apr. 5, 1966

3,244,402
APPARATUS FOR INSTALLING LINES
THROUGH CONDUITS
Glover C. Ensley, 525 N. Woodland Drive,
Kansas City North, Mo.
Filed Jan. 20, 1964, Ser. No. 338,963
11 Claims. (Cl. 254—134.3)

This invention relates to an apparatus for threading a line through a conduit utilizing a portable blower or the like having a continuous output flow of air for subsequently drawing a relatively rigid line through the conduit which cannot be initially passed through the conduit by air alone.

Various apparatus and methods have been heretofore devised for threading a line through a conduit, such as manual threading or "fishing" utilizing a metal tape, which is tedious and hard to handle, or pressurized air from a highly pressurized tank or the like. Other methods have included the use of a rubber ball-like projectile to which the guide line is attached, which also includes and encounters various difficulties, making them unsatisfactory.

The principal object of the present invention is to provide means for threading a line through a conduit having various turns or bends therein by attaching to the end of the line a line carrier of sponge-like material having a portion through which air will not penetrate, so that the carrier will be propelled through the conduit by air furnished from a portable source, such as a vacuum cleaner type device, and having a portable line package with one end attached to a tube for connection to the conduit and the other end connected to a tube leading to the source of air supply, whereby when the line carrier is inserted into the conduit, release of the line from the line package will permit air flow to carry the line through the conduit.

Other objects of the present invention are to provide a line package having a central hollow core encased within a housing and mounted upon a tubular member extending from one end of the housing for maintaining the line package in elongated position whereby the line may be freely payed therefrom through push by the air on the line carrier; to provide locking mechanism on the housing for the line package to prevent movement of the line from the core when desired; and to provide a relatively low magnitude of air flowing through the line package and housing to contact the line carrier to maintain the momentum of the line carrier through the conduit.

Still other objects of the present invention are to provide a portable blower device which may be carried by the user in one hand and the line carrier inserted in the conduit and the other hand of the user utilized to carry the line package and control the locking mechanism thereon so that the line may be threaded through a conduit by one person with ease and within a relatively short time; to provide a mechanism wherein the line carrier will move around angular bends in the conduit without the line carrier becoming wedged therein or the line package becoming entangled as is likely where the line package is passed through the conduit; and to provide a mechanism of this character which employs a lower magnitude of fluid pressure against the line carrier than has heretobefore been known to carry the line through the conduit.

Still further objects of the present invention are to provide means for threading a line through a conduit when the conduit may have portions of slightly different diameter and the line carrier passes therethrough due to the air submitted behind it without the line becoming entangled as it passes through the conduit; to provide a line carrier having means to which the line may be readily attached and the carrier being of sufficient length to prevent turning longitudinally in the conduit; and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective diagrammatic view of the blower element and a conduit through which a line is to be threaded and a line package and housing connected by flexible hoses between the blower and conduit.

FIG. 2 is an enlarged cross-sectional view particularly illustrating the line package and housing with tubular members for connection to the conduit and the blower apparatus.

FIG. 3 is an elevational view illustrating the line package housing.

FIG. 4 is an enlarged cross-sectional view through the conduit with the line carrier shown therein also in cross-section.

Referring more in details to the drawing:

1 designates a conduit through which the line 2 is to be threaded. The conduit may be either above ground or underground and the term "conduit" includes ducts or pipes of various sizes and is exemplary of an environment with which this present invention may be utilized.

In accordance with the preferred embodiment of the invention there is provided for use with the conduit having open ends the apparatus for threading a line through the conduit wherein a portable source of air is utilized one such source of air being through a conventional portable electric vacuum cleaner for use at one end of the conduit. The vacuum cleaner housing is illustrated at 3 (FIG. 1) and is mounted upon casters or the like 4. The cleaner or blower element includes a removable top 4' having an offset portion 5 with an upwardly extending portion 6 forming a housing for a squirrel-cage fan (not shown) and mounted on the housing 6 is a motor 7 having a handle 8 mounted thereabove. The housing 6 includes a by-pass or tubular connection 9 to which a flexible hose 10 is adapted to be attached as indicated at 11. The motor has an electric cord 12 running to a source of supply (not shown) and also includes a switch 13 for the motor 7.

14 designates a housing for the line package 15 and one end of the housing is tapered as indicated at 16 terminating in a tubular portion 17. The other end 18 of the housing 14 is adapted to engage with a resilient member 19 that is adhered to the inside of a removable end cover portion 20 as indicated at 21. The cover member portion has flanges 22 adapted to fit over the end 18 of the housing 14. From the flange portion 22 the cover 20 then tapers as at 23 and terminates in a tubular portion 24 to which the hose 10 is suitably secured. The tubular portion 24 of the cover member 20 forms a passageway 25 to receive a tubular support member 26 which supports the line package 15 at 27.

The portion 27 of the tubular support member or sleeve 26 extending into the housing 14 forms a support for a core member 28 of the line package 15, the line 2 being wound therearound as indicated at 29 (FIG. 2) and one end 30 of the line 2 extends through the tubular portion 17 of the housing 14 and through a flexible tubular member 31 and has its end attached to a line carrier 32. The core member 28 may be made of a rigid material, such as cardboard, plastic or the like, and a tight fit is maintained between said support 26 and said core member so the pull of the line 2 will not alter the position of the line package thereon.

The cover or closure member 20 extending over the end 18 of the housing 14 of the line package 15 is removable and is held on the housing by locking members as indicated at 33. The end 34 of the core 28 engages with the resilient member 19 when it is mounted on the supporting tube 26 as indicated at 35. The opposite end 34' of the core 28 extends outwardly from the line 29 as indicated at 35' (FIG. 2) which is engaged by a plunger-type locking member 36 which extends through an opening 37 in the top wall of the housing 14. The plunger 36 has a hook portion 38 extending laterally therefrom inside a handle member 39. The upper portion of the plunger 36 extends through a groove 40 of the handle member in alignment with the opening 37, the groove 40 of the handle being closed by a pivoted keeper 41. Mounted between the hook member 38 and the underneath side of the handle 39 is a coil spring 42 normally urging the end 43 of the plunger 36 toward and partially across the end of the core 28 so that the plunger will engage against the core as shown in FIG. 2 to lock the line package and prevent unwinding of the line from the core.

A lock member 44 is provided on the top or bar member 45 of the handle 39 to hold the plunger member 36 in a raised or line releasing position as illustrated in FIGS. 1 and 3. The lock member 44 is located adjacent said opening 40 and is shown behind same and consists of a slidable bar member 46 having a hand hold such as an upstanding flange 47 to the rear thereof for moving same. A slot 48 is cut therethrough for receiving a screw or the like 49 which is engaged in a threaded bore 50 in the top 45 of the handle 39. The upper portion of the plunger 36 has a notch 51 therein for receiving the end 52 of the bar 46. The bar is slidable between the under side of the head 53 of the screw 49 and the top surface of the top or bar member 45 of the handle 39, and is operated by the engagement of a thumb (not shown) with the flange 47 and by sliding same into and out of the notch 51 while a finger (not shown) supports the hook portion 38 in a line releasing position.

The end 54 of the flexible tubular member 31 is secured to the end 17 of the line package housing 14 by a fastening device 54' which is the usual practice, and the end 55 of the flexible tube 10 is secured to the tubular portion 24 of the removable cover 20 by a fastening device 56.

In FIG. 4 I have illustrated the line carrier 32 in the conduit 1 as being in two sections 57 and 58 having a rod 59 extending longitudinally therethrough with hooks 60 and 61 at each end thereof and to one of which the end 30 of the line 2 is secured as indicated at 62 (FIG. 4). I preferably use polyurethane or other suitable sponge material for the carrier and while I have here illustrated two sections, any number of sections greater than one may be used. A pair of rigid discs 62' are mounted on the carrier 32 between said eyelets and the sponge portions to prevent the eyelets from being enveloped therein. I secure the sections together by an adhesive as indicated at 63 so the air will not pass longitudinally through the carrier, but will push the carrier along through the conduit.

In use of the apparatus assembled as described the blower element 6 is transported to the place of use with the hose 10 attached thereto and the line package housing in place as shown in FIG. 1. The line package housing is carried in the hand by the handle 39 and the carrier 32 inserted in the end 64 of the conduit. The end 65 of the flexible tube 31 is then placed directly against the end 64 of the conduit and the motor 7 is energized by the switch 13 so that air from the blower will pass through the tubular member 10, line package housing 14, and tube 31 so the conduit. The locking plunger 36 is then raised or released from the end 34' of the core 28 of the line package by the upward pressure of a finger (not shown) on the hook 38 to raise the plunger transversely away from the core 28. This will allow the line 2 to unwind from the core and at the same time the carrier will travel through the conduit. If at any time it is desired to stop the line from unwinding, the finger is released from the hook 38 to again lock the line from unwinding.

It is unnecessary to carry the housing 66 and lower portion of the vacuum cleaner from place to place as the cover 5 may be lifted therefrom and by grasping the handle 8 the motor and fan element may be carried to a place of use along with the line package element and the same steps taken to pass the line through the conduit as above described.

The blower 3 is as heretofore stated somewhat similar to an electric vacuum cleaner and includes a dust or dirt collecting element therein (not shown) and also includes a tubular element 67 in one side of the housing 66 whereby a suction port is provided so that by fastening of the end 11 of the hose 10 to the suction port or tube 67, the line carrier 32 may be drawn through the conduit 1 by vacuum instead of blowing the same therethrough. In some instances the suction method may be desirable but generally the blowing of the line carrier through the conduit is preferable.

It will be obvious from the foregoing that I have provided an improved apparatus for passing a line through a conduit, and particularly a line package for paying the line through the conduit in a manner not heretofore known.

It is to be understood that while one form of this invention has been illustrated and described, it is not to be limited to the specific form or arrangement of parts herein described and shown except insofar as such limitations are included in the claims.

What I claim and desire to secure by Letters Patent is:

1. Apparatus for introducing a line through a conduit having open ends comprising, a line package, a housing for said line package having oppositely extending tubular ends, a support in one end of said housing over which one end of said line package extends, said support and said link package forming a fluid passageway through said housing, flexible tubular members attached to the respective tubular ends of said housing, a source of fluid pressure, one end of one of said flexible tubular member being connected to said source of fluid supply, and a carrier having an end of said line attached thereto adapted to be inserted in an open end of said conduit, the free end of the other flexible member being adapted to engage against said last named open end of the conduit whereby said fluid pressure will cause said carrier and line to travel through said conduit.

2. The combination of claim 1 wherein said line package has an elongated core and said support consists of a tubular member sealed in one end of said housing.

3. The combination of claim 1 including means carried by said housing engaging said line package for preventing the said line from unwinding therefrom.

4. The combination of claim 2 wherein said core extends outwardly of said line package, and means carried by said housing engaging said core to prevent the line from unwinding therefrom.

5. The combination of claim 4 including means for releasing said core engaging means to allow said line to be removed from said line package.

6. Apparatus for introducing a line through a conduit having open ends comprising, a line package having a hollow core and having one end of said core extending outwardly of the line wound thereon, a housing for said line package having oppositely extending tubular ends, a tubular support in one end of said housing over which one end of said core extends, said support and said core forming a fluid passageway through said housing, flexible tubular members attached to the respective tubular ends of said housing, a source of fluid pressure, one end of one of said flexible tubular members being connected to said source of fluid supply, said housing having a handle and said housing and handle having aligned openings, a bolt extending through said openings, means urging said bolt into engagement with the end of said core to prevent the line from unwinding from said core, means for disengaging said bolt from the core, and a carrier having an end of said line attached thereto adapted to be inserted in an open end of said conduit, the free end of the other flexible member being adapted to engage against said last named open end of the conduit whereby said fluid pressure will cause said carrier and line to travel through said conduit.

7. The combination of claim 6 including means on said handle for holding said bolt disengaged from said core.

8. Apparatus for introducing a line through a conduit having open ends comprising, a line package having a hollow core, a housing for said line package having reduced ends terminating in oppositely extending tubular members, one end of said housing being removable and including a resilient member having a central opening therein, a tubular support in the removable end of said housing engaging in said opening of said resilient member over which one end of said core extends, one end of said core engaging against said resilient member, said support and said core forming a fluid passageway through said housing, flexible tubular members attached to the respective ends of said housing, a source of fluid pressure, one end of one of said flexible tubular members being connected to said source of fluid supply, and a carrier having an end of said line attached thereto adapted to be inserted in an open end of said conduit, the free end of the other flexible member being adapted to engage against said last named open end of the conduit whereby said fluid pressure will cause said carrier and line to travel through said conduit.

9. The combination of claim 8 including means carried by said housing engaging one end of said core for preventing said line from unwinding from said package.

10. Apparatus for threading a line through a conduit having open ends comprising, a portable blower element for use at one end of the conduit, a flexible tube having one end connected to said blower element and another end adapted to engage against said one end of the conduit, an elongated housing having tubular ends attached to said flexible tube spaced from one end thereof, a line package having an opening therethrough of substantially the same size as the tubular ends of said housing, means in on end of said housing supporting said line package with the opening thereof coaxial with said tubular ends, means carried by said housing and engaging said line package to prevent the line from unwinding therefrom, a carrier having an end of said line attached thereto for insertion in said one end of the conduit, and means for disengaging said last named means from engagement with said line package whereby air from said blower element will cause said carrier with said line to move through said conduit.

11. The combination of claim 10 including means for releasing said line package engaging means and means for holding said line package engaging means in released position.

References Cited by the Examiner
UNITED STATES PATENTS 443,823  12/1890  Cope _____ 254—134.4

FOREIGN PATENTS 10,705  4/1910  Great Britain.

EDWARD C. ALLEN, *Primary Examiner.*

OTHELL M. SIMPSON, *Examiner.*